United States Patent
Godbole

(10) Patent No.: US 9,819,022 B2
(45) Date of Patent: Nov. 14, 2017

(54) BATTERY CELL AND METHOD OF OPERATING THE SAME

(71) Applicant: Robert Bosch GmbH, Stuttgart (DE)

(72) Inventor: Vikram Anil Godbole, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 14/693,407

(22) Filed: Apr. 22, 2015

(65) Prior Publication Data

US 2015/0311528 A1 Oct. 29, 2015

(30) Foreign Application Priority Data

Apr. 24, 2014 (DE) .................. 10 2014 207 678

(51) Int. Cl.
| | |
|---|---|
| *H01M 4/60* | (2006.01) |
| *H01M 4/583* | (2010.01) |
| *H01M 4/133* | (2010.01) |
| *H01M 10/052* | (2010.01) |
| *H01M 4/587* | (2010.01) |
| *H01M 10/42* | (2006.01) |

(52) U.S. Cl.
CPC ......... *H01M 4/5835* (2013.01); *H01M 4/133* (2013.01); *H01M 4/583* (2013.01); *H01M 4/587* (2013.01); *H01M 4/60* (2013.01); *H01M 10/052* (2013.01); *H01M 10/4235* (2013.01); *Y02T 10/7011* (2013.01)

(58) Field of Classification Search
CPC .. H01M 4/587; H01M 10/4235; H01M 4/133; H01M 4/583
See application file for complete search history.

(56) References Cited

U.S. PATENT DOCUMENTS

| | | | | |
|---|---|---|---|---|
| 5,571,454 | A | * 11/1996 | Chen | H01B 1/127 252/500 |
| 2002/0182476 | A1 | * 12/2002 | Reynolds, III | C04B 35/536 428/304.4 |
| 2008/0254355 | A1 | 10/2008 | Muraoka et al. | |
| 2009/0068563 | A1 | * 3/2009 | Kanda | H01M 4/13 429/306 |
| 2011/0159372 | A1 | * 6/2011 | Zhamu | H01G 11/38 429/232 |
| 2013/0136995 | A1 | * 5/2013 | Cho | A23L 7/10 429/231.8 |

FOREIGN PATENT DOCUMENTS

| | | |
|---|---|---|
| DE | 10 2007 053 652 A1 | 5/2009 |
| EP | 1 323 670 A2 | 7/2003 |

(Continued)

OTHER PUBLICATIONS

Zheng, et al.; Electrical conductivity and dielectric properties of PMMA/expanded graphite composites; Composites Science and Technology; 2003; pp. 225-235, vol. 63.

(Continued)

*Primary Examiner* — Mark F Huff
*Assistant Examiner* — Monique Wills
(74) *Attorney, Agent, or Firm* — Maginot, Moore & Beck LLP

(57) ABSTRACT

A battery cell includes a negative electrode and a positive electrode. The battery cell also contains a thermally expandable graphite intercalation compound.

16 Claims, 1 Drawing Sheet

(56) References Cited

FOREIGN PATENT DOCUMENTS

| EP | 1 489 136 A1 | 12/2004 |
| JP | 2004-30998 A | 1/2004 |
| WO | 2011/039301 A1 | 4/2011 |

OTHER PUBLICATIONS

Greenwood, et al.; Graphite Intercalation Compounds; Chemistry of the Elements, Second Edition, 1997; pp. 293-296; Butterworth-Heinemann (Reed Elsevier plc group).
"Expandable Graphite", Downloaded Feb. 16, 2017 from http://northerngraphite.com/expandable-graphite/, 2 pages.
Zhi-jun et al., "CaCl2—6H2O/Expanded graphite composite as form-stable phase change materials for thermal energy storage", Journal of Thermal Analysis and Calorimetry, Jan. 2014, 115:111-117.

* cited by examiner

BATTERY CELL AND METHOD OF OPERATING THE SAME

This application claims priority under 35 U.S.C. §119 to patent application number DE 10 2014 207 678.1, filed on Apr. 24, 2014 in Germany, the disclosure of which is incorporated herein by reference in its entirety.

BACKGROUND

The present disclosure relates to a battery cell and to a method of operating the same.

Lithium ion batteries have now become widespread in products such as cellular phones and electric vehicles. A lithium ion battery usually comprises a cathode and an anode between which a separator comprising a carbonate-based electrolyte is located. In a first charging of the battery, lithium ions are liberated by the cathode, migrate through the separator and are stored in the material of the anode. During discharge, a reverse flow of the lithium ions is established.

Over a prolonged period of operation with numerous charging and discharging cycles of the lithium ion battery, short circuits attributable to the formation of lithium dendrites or metallic impurities which affect both the anode and the cathode can occur in the battery. Such short circuits lead to a rapid increase in the internal battery temperature to temperatures greater than 200° C.-250° C. If the thermal energy liberated here exceeds a particular limit, the carbonate-based electrolyte decomposes and produces large volumes of predominantly toxic gases. These large amounts of toxic gases are given off into the surroundings of the battery in a relatively short time or the battery explodes as a result of the excessive internal pressure.

To avoid such short circuits, lithium ion batteries of this type normally comprise at least one layer composed of a metal oxide such as aluminum oxide or titanium dioxide which is positioned on the large area of the anode or the cathode. This layer is referred to as safety function layer (SFL) or as heat retardant layer (HRL). It is electrically nonconductive and thus increases the internal, electrical resistance of the battery and adversely affects the electrochemistry within the lithium ion cell. Furthermore, it increases the weight of the battery.

Thermally expandable graphite intercalation compounds are known from a different context, for example as fire protection materials. Thus, such compounds are disclosed, for example, in EP 1489136 A1, WO 2011/039301 A1 and EP 1323670 A2. The production of expanded graphite is disclosed, for example, in DE 102007053652 A1 and the production of expandable graphite intercalation compounds is described, for example, by the book N. N Queenwood and A. Earlshore, "Chemistry of the elements" Second Edition, Elsevier Butterworf-Heinemann 2005, p. 293 to p. 296.

SUMMARY

Compared to the above, the disclosure provides a battery cell and a method of operating the same having the characterizing features described herein, by means of which effective protection against overheating of battery cells can be realized in a simple way.

This is based, in particular, on the battery cell of the disclosure having at least one electrode which comprises a thermally expandable graphite intercalation compound. The particular advantage of thermally expandable graphite intercalation compounds is that when high temperatures, for example above 150° C., occur or when an electric short circuit occurs, they display a structural transformation which results in a substantial increase in volume and a significantly decreasing electrical conductivity of the graphite intercalation compound. This effect is based, in particular, on thermally expandable graphite intercalation compounds displaying a change in the layer structure of the graphite forming the basis of the graphite intercalation compound at elevated temperatures. The layers of SP2-hybridized carbon which are usually arranged parallel to one another in the graphite structure are broken up to form an essentially no longer parallel arrangement of carbon layers accompanied by an increase in volume by, for example, a factor of from 300 to 500. For example, if the thermally expandable graphite intercalation compound is applied in the form of a layer to the large area of one of the two electrodes of the battery cell, in particular to the large area of the respective electrode facing the other electrode, the formation of thermally expanded graphite leads, owing to the increasing volume of the thermally expandable graphite intercalation compound, to an increase in the distance between the two electrodes and thus possibly to elimination of an electrical short circuit which already exists between the electrodes. Furthermore, the increase in volume of the thermally expandable graphite intercalation compound is associated with consumption of energy.

A further advantage of the use of thermally expandable graphite intercalation compounds is that they display a sufficiently good electrical conductivity for battery applications but when thermal expansion of the graphite intercalation compounds occurs, a layer of expanded graphite which displays only a low residual electrical conductivity is formed on thermal expansion. This too, may lead to existing electric short circuits within the battery cell being eliminated.

It is particularly advantageous for metal oxide layers in the form of safety function layers (SFL) or heat retardant layers (HRL) present until now in the battery cell to be replaced by a layer of thermally expandable graphite intercalation compounds (GIC).

The increase in volume during the expansion of thermally expandable graphite intercalation compounds is based, in particular, on the intercalated molecules within the graphite layers decomposing at elevated temperatures and thus leading to formation of expanded graphite. The respective temperature at which expansion of the thermally expandable graphite intercalation compound occurs is dependent on the type of the intercalated compound.

BRIEF DESCRIPTION OF THE DRAWINGS

The figures show advantageous embodiments of the present disclosure and these are explained further in the following description of the figures. The figures show.

DETAILED DESCRIPTION

Figure 1:
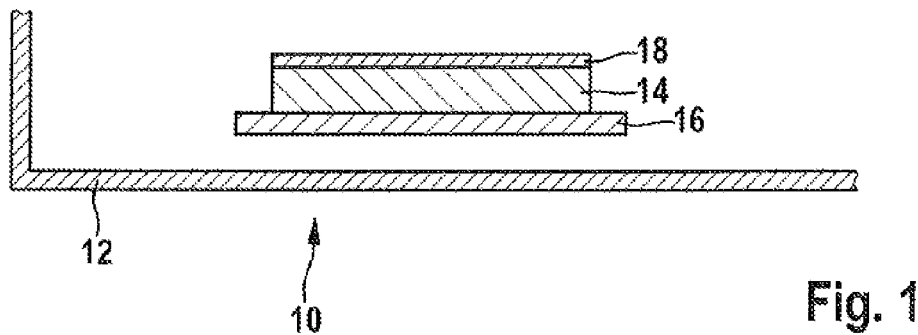
FIG. 1: the schematic cross section of an electrode of a battery cell according to the disclosure as per a first embodiment of the present disclosure

FIG. 1 shows a battery cell 10 according to the disclosure as per a first embodiment of the present disclosure. This comprises, for example, a housing 12 which is shown in sections and is made, for example, of a polymer or a metal. The battery cell 10 comprises a first electrode 14 which represents, for example, an anode of the battery cell 10. The first electrode 14 is, for example, positioned on a copper foil as power outlet lead 16. A protective layer 18 containing a thermally expandable graphite intercalation compound has, for example, been applied to the large area of the first electrode 14 facing away from the power outlet lead 16. The general method of preparing thermally expandable graphite intercalation compounds is described, for example, in W. Zheng, S. C. Wong "Electrical conductivity and dielectric properties of PMMA/expanded graphite composites" Composites Science and Technology 63 (2003), pp. 225-235. As intercalates for thermally expandable graphite intercalation compounds, it is possible to use, in particular, cations such as alkali metal cations of sodium, potassium, cesium or barium and also cations of the alkaline earth metals strontium, barium and calcium and also cations of the rare earth metals ytterbium and europium. Graphite intercalates of lithium ions, which are usually formed in the region of the anodes of lithium ion cells and can also be additionally formed here are not encompassed by this definition.

Further suitable intercalates for thermally expandable graphite intercalation compounds are halides, with metal halides such as iron chloride or copper chloride being particularly suitable. Further possible anions as intercalates are hexafluorophosphates, hexafluoroarsenates, perchlorates or hydrogensulfates. Sulfur trioxide as gas is also a suitable possible intercalate.

In addition, organometallic compounds such as $Cs(C_2H_4)$—$C_{24}$, $Ba(NH_3)_{2.5}$, —$C_{10.9}$, $K(NH_3)_{4.3}$—$C_{24}$, $RbN_2$—$C_{24}$, $KN_2$—$C_{24}$ and/or $C_xFeCl_3$—$CH_3NO_2$ are suitable as possible thermally expandable graphite intercalation compounds.

The thermally expandable graphite intercalation compound used according to the disclosure displays decomposition of the corresponding intercalate at elevated temperature, whereupon an increase in volume of the thermally expandable graphite intercalation compound occurs so that this is present as thermally insulating and electrically insulating thermally expanded graphite. In this way, electric short circuits and a thermal runaway reaction of battery cells can be effectively prevented. The respective temperature at which thermal expansion of the thermally expandable graphite intercalation compound occurs can be controlled via the type of intercalate. Thus, for example, graphite oxidized by means of sulfuric acid in the form of a graphite hydrogensulfate decomposes above 150° C. and graphite oxidized by means of nitric acid in the form of graphite nitrate decomposes above 210° C.

In an alternative embodiment, the protective layer 18 can, in addition or as an alternative, be applied to a second electrode (not shown in FIG. 1) of the battery cell 10.

Figure 2:
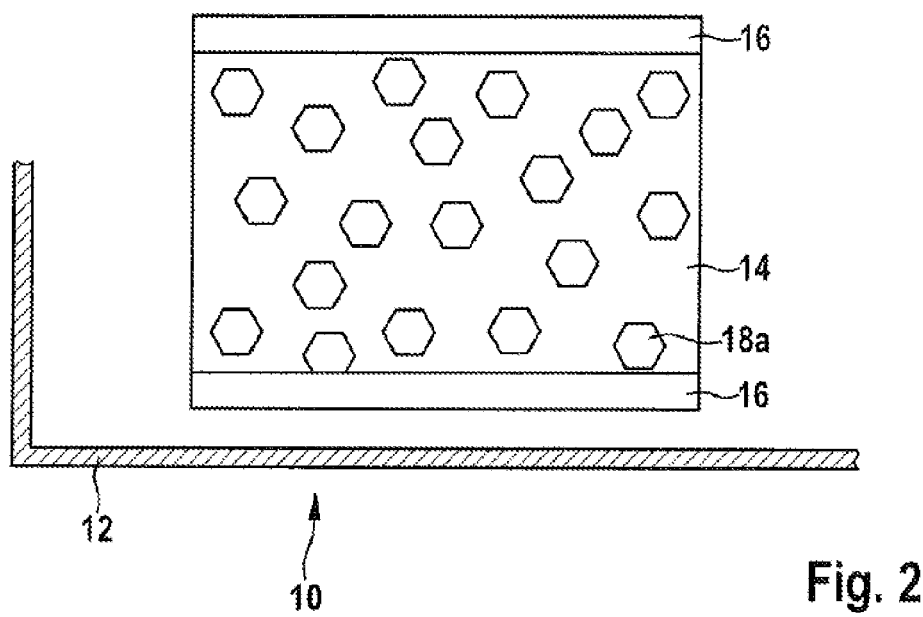
FIG. 2: a schematic depiction of a plan view onto an electrode of a battery cell according to the disclosure as per a second embodiment of the present disclosure.

FIG. 2 shows a battery cell 10 as per a second embodiment of the present disclosure. This comprises, within the housing 12, a first electrode 14 in the form of an anode which has on its surface a protective layer 18a in the form of individual areal segments, for example areal segments which are not joined to one another, containing a thermally expandable graphite intercalation compound. The particular advantage of this embodiment is that a protective layer 18a consisting merely of areal segments results in a lower electrical resistance against charge transfer between the first electrode 14 and a further electrode (not shown) of the battery cell 10. If a heat-related expansion of the protective layer 18a made up of areal segments occurs, an essentially full-area covering of the large area of the electrode 14 with expanded graphite is nevertheless achieved purely because of the increasing volume of the expanded graphite.

During operation of the battery cell 10, the thermally expandable graphite intercalation compound present in the protective layer 18 is initially present in an electrically conductive form. If a short circuit or excessive overheating occurs during operation of the battery cell 10, decomposition of the intercalates present in the thermally expandable graphite intercalation compound occurs as a result of thermal activation and the formation of expanded graphite on the surface of the first electrode 14 follows. Since expanded graphite is both thermally and electrically insulating, subsequent damage caused by the electric short circuit or a thermal runaway reaction in the battery cell 10 is avoided.

The battery cell 10 according to the disclosure can be used, for example, in the form of battery modules in mobile and stationary applications such as hybrid or electric vehicles and for the storage of electric energy in stationary applications.

What is claimed is:

1. A battery cell, comprising:
   a negative electrode;
   a positive electrode; and
   a thermally expandable graphite intercalation compound configured to expand within the battery cell when exposed to a predefined temperature.

2. The battery cell according to claim 1, wherein the thermally expandable graphite intercalation compound does not comprise lithium intercalates.

3. The battery cell according to claim 1, wherein at least one of the positive electrode and the negative electrode contains the thermally expandable graphite intercalation compound.

4. The battery cell according to claim 1, wherein the thermally expandable graphite intercalation compound contains:
   an alkali metal or an alkaline earth metal; and
   at least one of ytterbium and europium.

5. The battery cell according to claim 1, wherein the thermally expandable graphite intercalation compound contains a halide.

6. The battery cell according to claim 1, wherein the thermally expandable graphite intercalation compound contains at least one of a hexafluorophosphate, a hexafluoroarsenate, a perchlorate, a hydrogensulfate, a nitrate and sulfur trioxide.

7. The battery cell according to claim 5, wherein the halide is at least one of iron chloride and copper chloride.

8. The battery cell according to claim 1, wherein the thermally expandable graphite intercalation compound comprises an organometallic compound having at least one of the chemical formulas $Cs(C_2H_4)C_{24}$, $Ba(NH_3)_{2.5}C_{10.9}$, $K(NH_3)_{4.3}C_{24}$, $RbN_2$—$C_{24}$, $KN_2$—$C_{24}$, and $K(C_4H_8O)_2C_{24}$.

9. The battery cell according to claim 1, wherein the thermally expandable graphite intercalation compound is converted into expanded graphite at a temperature that is greater than 150° C.

10. A method of operating a battery cell having a negative electrode and a positive electrode, the method comprising:
    producing expanded graphite from a thermally expandable graphite intercalation compound that is contained within at least one of the positive electrode and the negative electrode by heating the thermally expandable graphite intercalation.

11. A battery module, comprising:
    at least one battery cell, including:
       a negative electrode;
       a positive electrode; and a thermally expandable graphite intercalation compound configured to expand within the battery cell when exposed to a predefined temperature.

12. The battery cell according to claim 1, wherein the battery cell is configured for use in at least one of battery-operated vehicles and energy technology.

13. The battery cell according to claim 5, wherein the halide is a metal halide.

14. The battery cell according to claim 1, wherein the thermally expandable graphite is provided as a layer between the negative electrode and the positive electrode.

15. The battery module according to claim 11, wherein the thermally expandable graphite is provided as a layer between the negative electrode and the positive electrode.

16. The method according to claim 10, wherein producing expanded graphite from a thermally expandable graphite intercalation compound comprises:

producing an expanded graphite layer on an area of an electrode facing away from a power outlet lead of the electrode.

\* \* \* \* \*